US009672350B2

(12) United States Patent
De Atley et al.

(10) Patent No.: US 9,672,350 B2
(45) Date of Patent: Jun. 6, 2017

(54) SYSTEM AND METHOD OF AUTHORIZING EXECUTION OF SOFTWARE CODE BASED ON AT LEAST ONE INSTALLED PROFILE

(75) Inventors: Dallas De Atley, San Francisco, CA (US); Heiko Panther, San Francisco, CA (US); Mitchell Adler, Cupertino, CA (US); Simon Cooper, Sunnyvale, CA (US); Michael Brouwer, San Jose, CA (US); Matt Reda, San Jose, CA (US)

(73) Assignee: Apple Inc., Cupertino, CA (US)

( * ) Notice: Subject to any disclaimer, the term of this patent is extended or adjusted under 35 U.S.C. 154(b) by 777 days.

(21) Appl. No.: 12/398,001

(22) Filed: Mar. 4, 2009

(65) Prior Publication Data

US 2009/0249065 A1    Oct. 1, 2009

Related U.S. Application Data

(60) Provisional application No. 61/033,735, filed on Mar. 4, 2008.

(51) Int. Cl.
| | |
|---|---|
| G06F 21/51 | (2013.01) |
| G06F 21/50 | (2013.01) |
| G06F 21/44 | (2013.01) |
| G06F 21/53 | (2013.01) |
| G06F 21/31 | (2013.01) |
| G06F 21/33 | (2013.01) |

(52) U.S. Cl.
CPC .............. *G06F 21/51* (2013.01); *G06F 21/31* (2013.01); *G06F 21/33* (2013.01); *G06F 21/44* (2013.01); *G06F 21/50* (2013.01); *G06F 21/53* (2013.01)

(58) Field of Classification Search
CPC .......... G06F 21/51; G06F 21/50; G06F 21/44; G06F 21/53; G06F 21/31; G06F 21/33
USPC ........................................................ 713/164
See application file for complete search history.

(56) References Cited

U.S. PATENT DOCUMENTS 6,553,375 B1 * 4/2003 Huang et al.
6,779,117 B1   8/2004 Wells
(Continued)

FOREIGN PATENT DOCUMENTS

| CN | 1146122 | 3/1997 |
| EP | 0328232 A2 | 8/1989 |

(Continued)

OTHER PUBLICATIONS

Apple Inc., Code Signing Guide, May 15, 2007.
(Continued)

*Primary Examiner* — Morshed Mehedi
*Assistant Examiner* — Ayoub Alata
(74) *Attorney, Agent, or Firm* — Blakely, Sokoloff, Taylor & Zafman LLP

(57) ABSTRACT

Embodiments include systems and methods for authorizing software code to be executed or access capabilities in secure operating environments. Profiles may be issued by trusted entities to extend trust to other entities to allow those other entities to provide or control execution of applications in a secure operating environment such as on particular computing devices. The profiles allow entities to add software code to the device without reauthorizing each distribution by a trusted authority such as testing, quality assurance, or to limited groups of devices controlled or authorized by the other entities.

24 Claims, 9 Drawing Sheets

(56) References Cited

U.S. PATENT DOCUMENTS

| | | |
|---|---|---|
| 6,785,815 B1 | 8/2004 | Serret-Avila et al. |
| 7,080,000 B1 * | 7/2006 | Cambridge ............... 703/21 |
| 7,103,779 B2 | 9/2006 | Kiehtreiber et al. |
| 7,246,098 B1 | 7/2007 | Walmsley |
| 7,346,163 B2 | 3/2008 | Pedlow, Jr. et al. |
| 7,356,815 B2 | 4/2008 | Sarfati |
| 7,543,336 B2 | 6/2009 | Lampson et al. |
| 7,685,263 B2 | 3/2010 | Redaian et al. |
| 7,813,910 B1 | 10/2010 | Poulin |
| 7,877,087 B2 | 1/2011 | Liwell et al. |
| 8,589,140 B1 | 11/2013 | Poulin |
| 2001/0034839 A1 | 10/2001 | Karjoth et al. |
| 2002/0059425 A1 | 5/2002 | Belfiore et al. |
| 2002/0078380 A1 * | 6/2002 | Lin et al. ............... 713/201 |
| 2002/0184046 A1 | 12/2002 | Kamada et al. |
| 2002/0194484 A1 | 12/2002 | Bolosky et al. |
| 2003/0131239 A1 | 7/2003 | Greene et al. |
| 2004/0064457 A1 | 4/2004 | Zimmer et al. |
| 2004/0098599 A1 | 5/2004 | Bentley |
| 2004/0196975 A1 | 10/2004 | Zhu et al. |
| 2005/0239504 A1 | 10/2005 | Ishii et al. |
| 2005/0246554 A1 | 11/2005 | Batson |
| 2006/0143179 A1 | 6/2006 | Draluk et al. |
| 2006/0150256 A1 * | 7/2006 | Fanton et al. ............. 726/27 |
| 2006/0177068 A1 | 8/2006 | Hatakeyama |
| 2006/0218642 A1 * | 9/2006 | Kuppusamy et al. ........ 726/26 |
| 2007/0099599 A1 | 5/2007 | Smith et al. |
| 2007/0117585 A1 | 5/2007 | Juneja et al. |
| 2007/0240194 A1 | 10/2007 | Hargrave |
| 2009/0069051 A1 | 3/2009 | Jain et al. |
| 2009/0222842 A1 | 9/2009 | Narayanan et al. |

FOREIGN PATENT DOCUMENTS

| | | |
|---|---|---|
| EP | 0752786 A1 | 1/1997 |
| EP | 0798892 A2 | 10/1997 |
| EP | 1076301 A2 | 2/2001 |
| EP | 1217850 | 6/2002 |
| EP | 1465039 A1 | 10/2004 |
| EP | 1496419 A1 | 1/2005 |
| EP | 1739591 A2 | 1/2007 |
| JP | H10-040100 | 2/1998 |
| JP | H10-282882 | 10/1998 |
| JP | 2001-034470 | 2/2001 |
| JP | 2001-147826 | 5/2001 |
| JP | 2001-147898 | 5/2001 |
| JP | 2002-353960 | 12/2002 |
| JP | 2003-202929 | 7/2003 |
| JP | 2003-524252 | 8/2003 |
| JP | 2004-514214 | 5/2004 |
| JP | 2007-52618 | 3/2007 |
| WO | WO 98/26535 | 6/1998 |
| WO | WO 01/10076 A2 | 2/2001 |
| WO | WO 01/63385 A1 | 8/2001 |
| WO | WO 02/41147 A1 | 5/2002 |
| WO | WO 2004/032328 A2 | 4/2004 |
| WO | WO 2006/083015 | 8/2006 |
| WO | WO 2006/083015 A2 | 8/2006 |
| WO | WO 2006/101549 | 9/2006 |

OTHER PUBLICATIONS

International Search Report and Written Opinion dated Aug. 17, 2009 for PCT Application No. PCT/US2009/035750.
Garfinkel, Simson, et al., "Web Security, Privacy & Commerce, 2$^{nd}$ Edition", Jan. 2002, pp. 560-562, O'Reilly Media, Inc., Sebastopol, CA.
Schneier, B., "Applied Cryptography, Second Edition: Protocols, Algorithms, and Source Code in C," 1996, John Wiley & Sons, Inc., section 18.7, pp. 442-445.
International Search Report and Written Opinion dated Aug. 19, 2009 for PCT Application No. PCT/US2009/035744.
International Search Report and Written Opinion dated Aug. 21, 2009 for PCT Application No. PCT/US2009/035755.
International Search Report and Written Opinion dated Aug. 17, 2009 for PCT Application No. PCT/US2009/035752.

* cited by examiner

SYSTEM AND METHOD OF AUTHORIZING EXECUTION OF SOFTWARE CODE BASED ON AT LEAST ONE INSTALLED PROFILE

CROSS REFERENCE TO RELATED APPLICATIONS

This application claims the benefit of U.S. Provisional Patent Application No. 61/033,735, filed on Mar. 4, 2008, which is hereby incorporated by reference in its entirety.

BACKGROUND

Field

This application relates to controlling execution of software code.

Description of the Related Technology

Computing devices may be configured to require that code executed on the computer system be authorized by a trusted party. For example, such authorization may be used to help ensure that the integrity of the computing device is not compromised by malicious or unauthorized code. In some cases computing devices may be configured to require that code be digitally signed by the trusted party and verified in order to be executed on the computing device and/or to control execution of software that accesses particular resources or services of the device. Verification of the digital signature helps to ensure that the underlying application code has not been modified since it was digitally signed by trusted authority 102. However, this security scheme presents challenges in allowing multiple entities to implement their policies on the device.

For example, during development, a software developer will frequently modify their code on a computer system and may attempt to test it on that system. Each time the code may be modified, the digital signature becomes invalid. Therefore, in order to execute any new or modified code, the software developer must have that code signed again by trusted authority 102. This process can be cumbersome and time consuming.

DETAILED DESCRIPTION

Embodiments are provided, which allow software developers to have certain trusted rights in developing and controlling the execution of software on a device. In a computing device in, which applications are cryptographically signed by a first trusted party, a developer profile may be provided that provisions operation of the device to extend trust to applications signed by a second party for a specified list of devices identified by device identifiers. A particular profile may enable applications to run on a device from multiple developers, run on multiple devices, and specify different available capabilities for different devices, profiles, and/or developers.

Control of application execution may be maintained in a trusted space of a processor of the device. The trusted space may include a privileged or supervisor mode or memory space of the processor, such as kernel space of the memory. A service (or process) running in untrusted space, such as user space of memory, may be configured to manage profiles and determine whether a particular application is executable and identify trusted applications to the trusted space. The untrusted space may include a memory space of a user-mode or unprivileged process executing on the processor.

Cryptographic functions and their accompanying calculations may be performed by the user space service. In addition, the user space service may be configured to authenticate software based on one or more profiles and policies that may be specific to a particular developer profile, a particular device identifier, a particular carrier, etc. Separating these logically and computationally complex processes from the trusted space may improve software system reliability and performance and enables use of complex encryption and policy enforcement.

Figure 1:
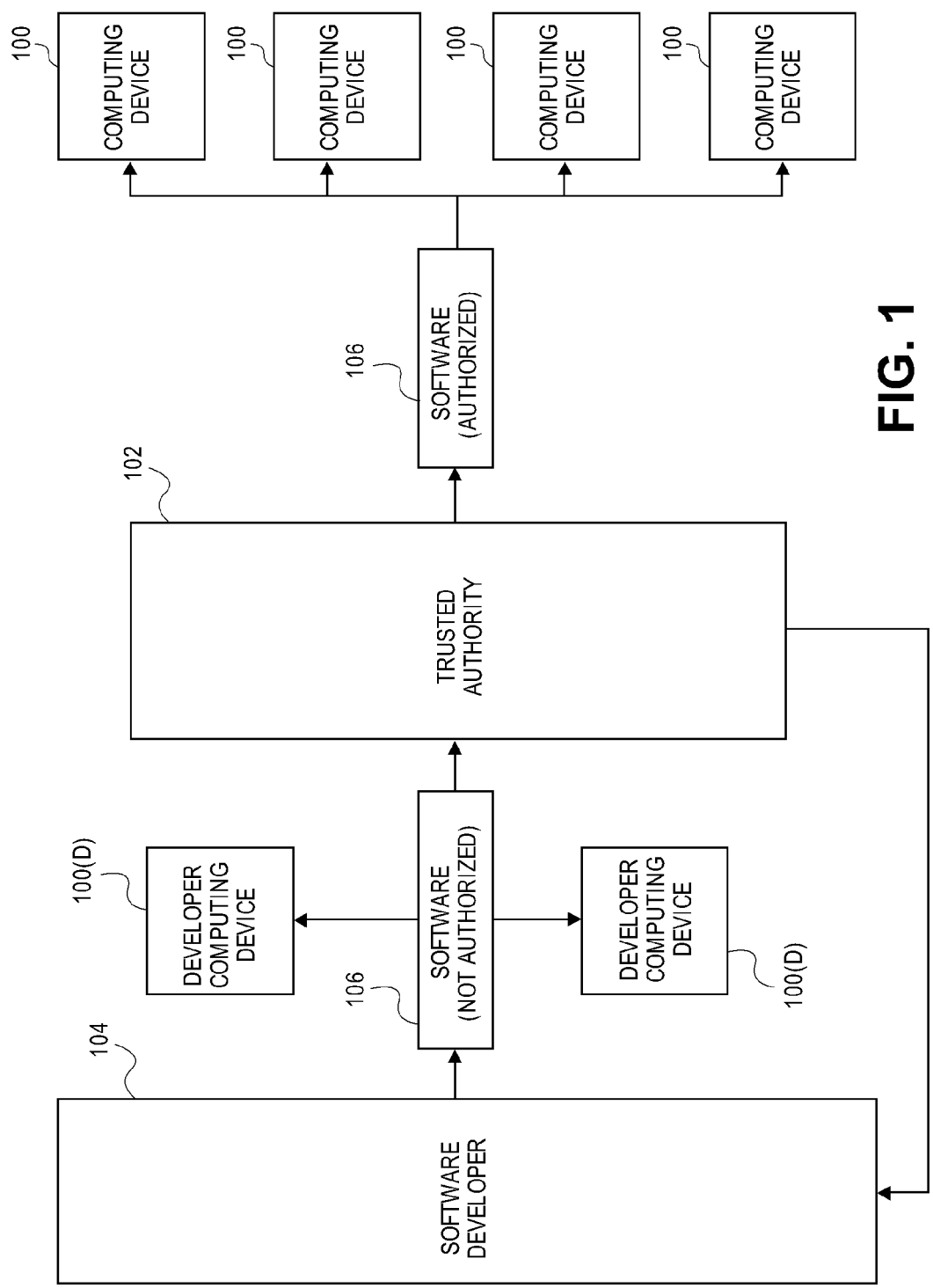
FIG. 1 is a block diagram illustrating an example of a computing environment in, which software code is distributed from one or more developers to computing devices.
Figure 2:
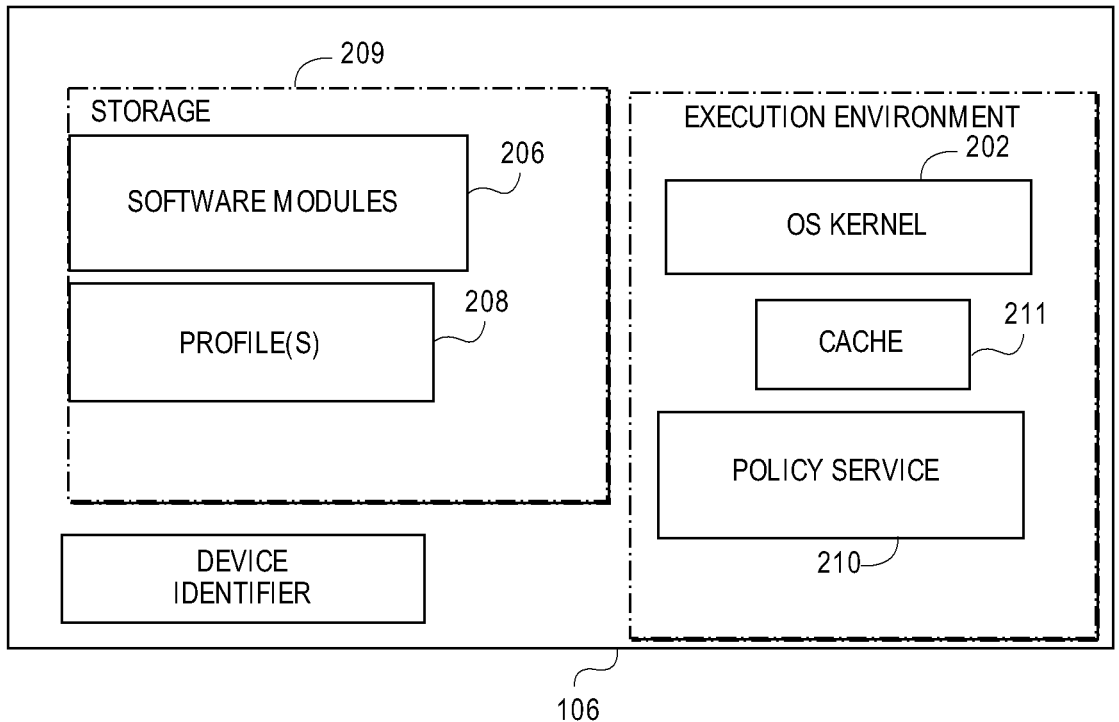
FIG. 2 is a block diagram illustrating one embodiment of software components of a computing device in an environment such as illustrated in FIG. 1.
Figure 3:
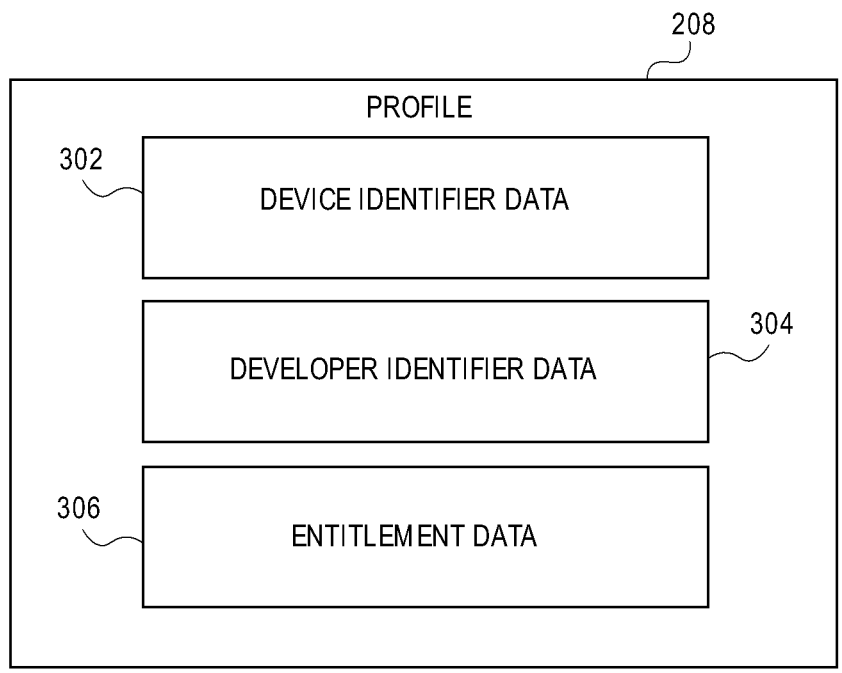
FIG. 3 is a block diagram illustrating one embodiment of a profile for controlling execution of software on a device such as illustrated in FIG. 2.
Figure 4:
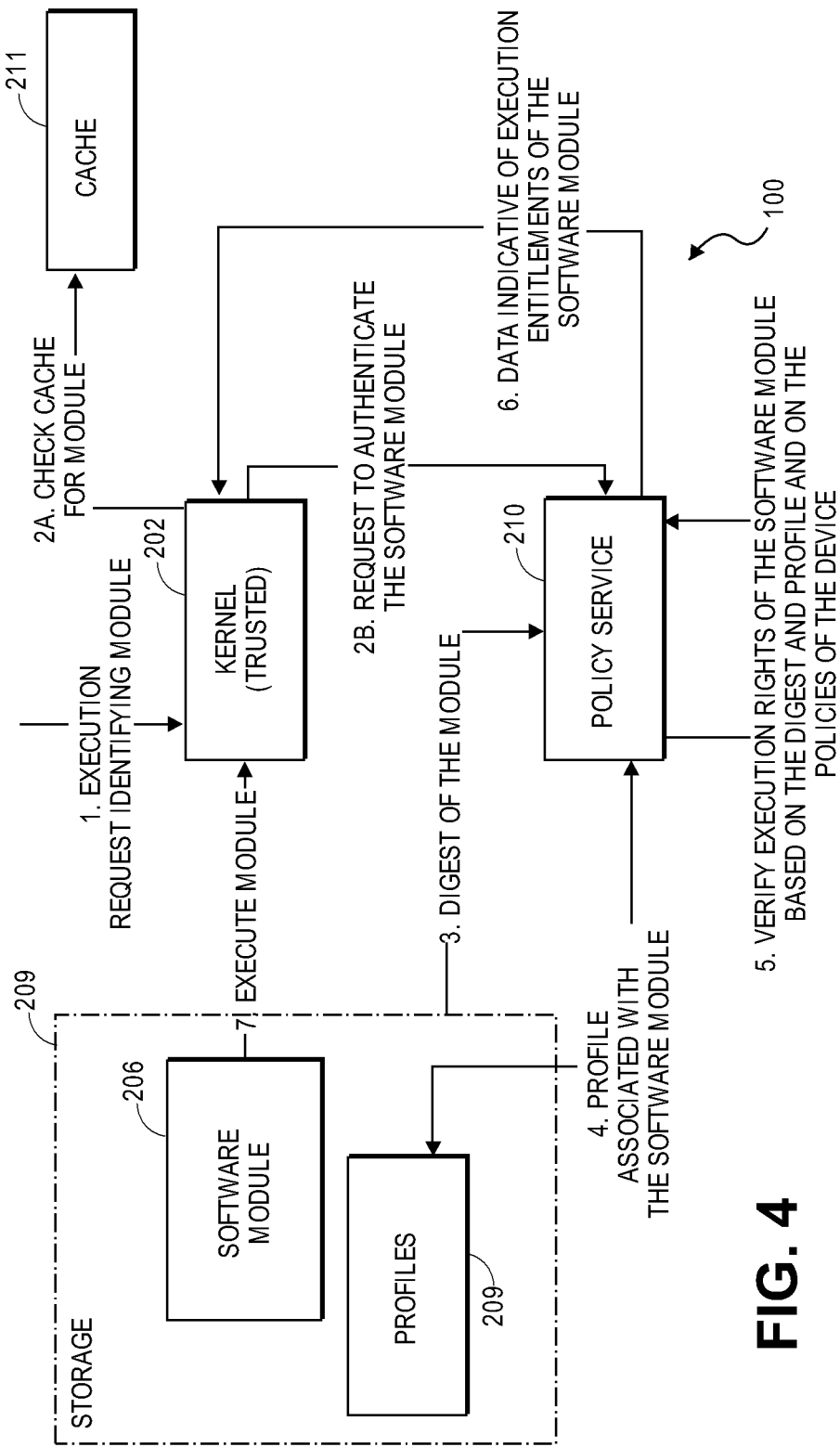
FIG. 4 is a block diagram illustrating data flow between software components of one embodiment of the computing device illustrated in FIG. 2.
Figure 5:
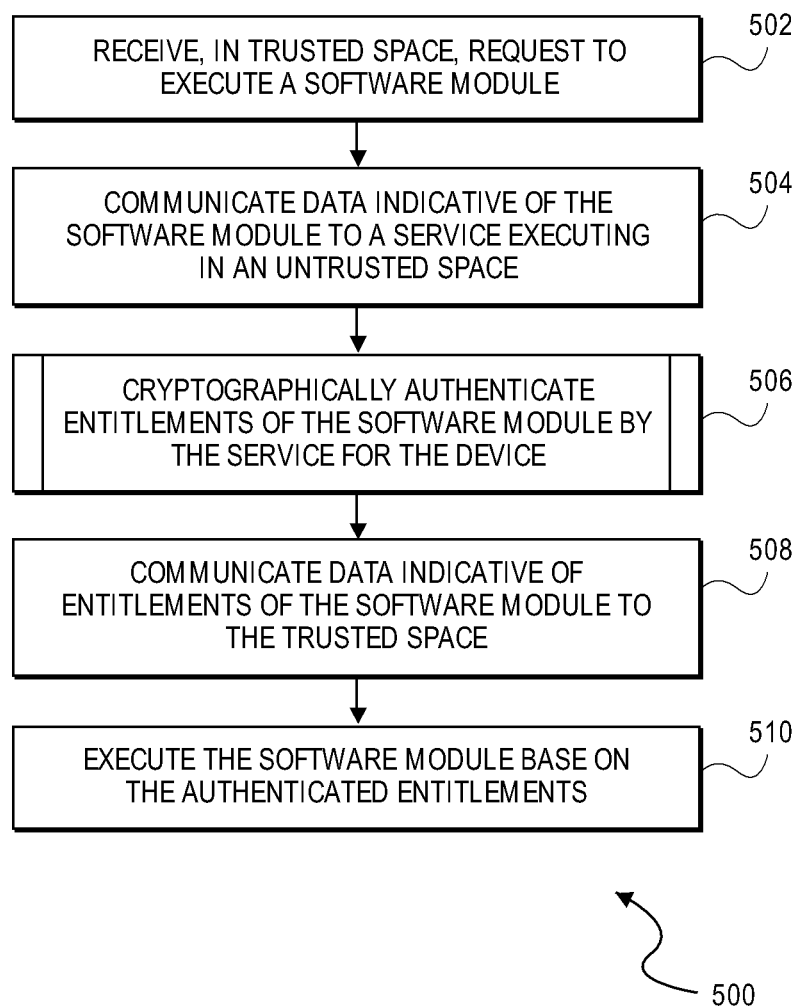
FIG. 5 is a flowchart illustrating on embodiment of a method of executing software based on profiles such as illustrated in FIG. 2.
Figure 6:
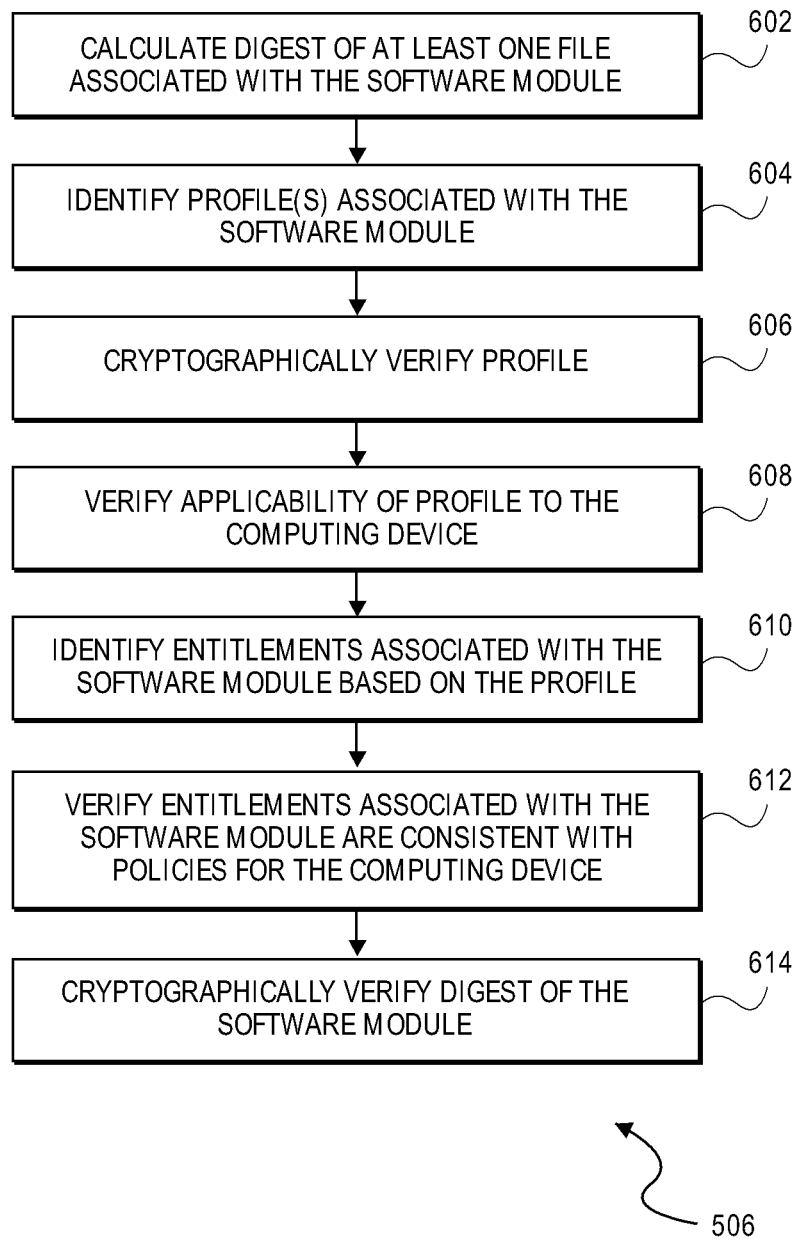
FIG. 6 is a flowchart illustrating portions of the method of FIG. 5 in more detail.
Figure 7:
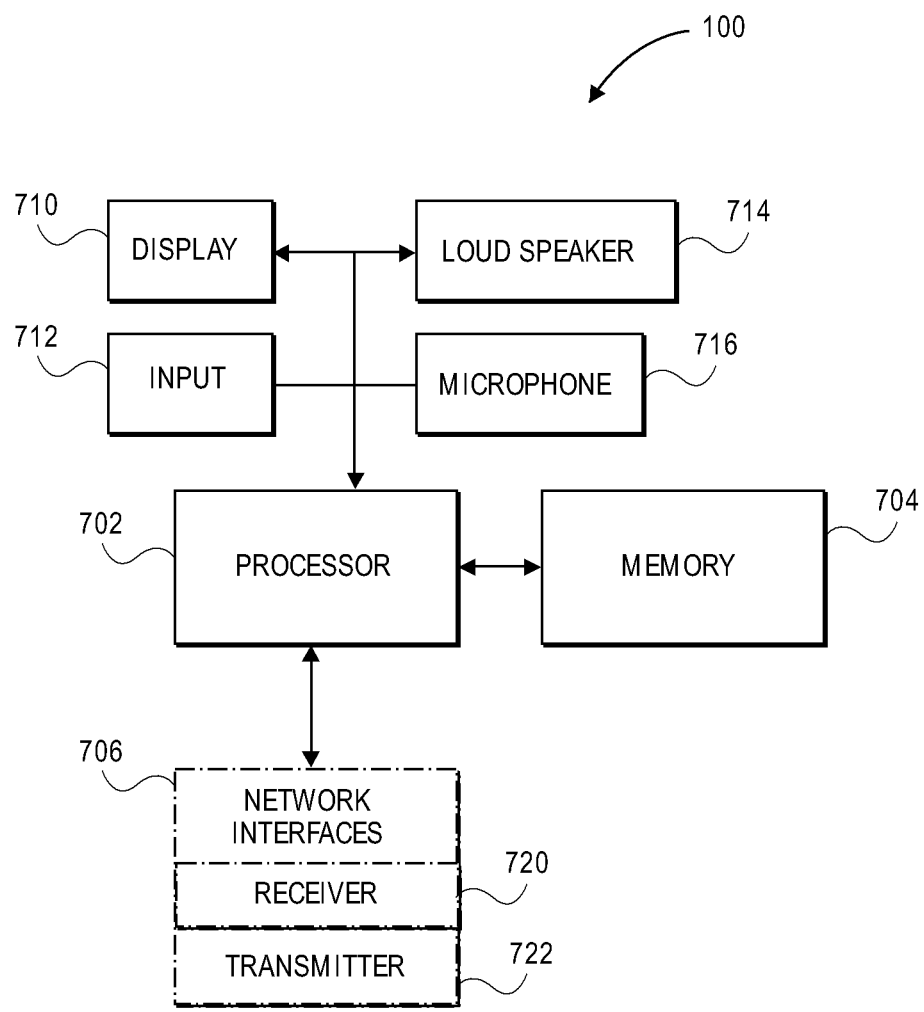
FIG. 7 is a block diagram illustrating one example of a computing device such as illustrated in FIG. 2.

In order to illustrate embodiments of the present invention, FIGS. 1-7 will now be presented below. FIG. 1 illustrates an overall system diagram in, which embodiments may be implemented. FIGS. 2-3 show embodiments of software components and exemplary profile for controlling execution of software. FIG. 4 shows one example of a data flow between software components. FIGS. 5-6 then illustrate process flowcharts for executing software based on profiles. FIG. 7 is provided to illustrate one example of a mobile computing device. These figures will now be further described below beginning with reference to FIG. 1.

FIG. 1 is one example of a computing environment, which allows for the distribution of authorized software code to computing devices, which are configured to execute only authorized code. Computing devices 100 may be any number of different types of computing devices, including mobile communication devices, desktop computers, laptop computers, handheld computers, personal digital assistant (PDA) devices, mobile telephone devices, media play device, and the like. The computing devices 100 may be configured to require that any code executed on computing device 100 be authorized by trusted authority 102. In other embodiments, more complex authorization schemes may be used, for example, unauthorized software may be executable but only for limited purposes or to access limited device resources while authorized software may be provided more extensive access to resources of device 100.

As will be discussed in more detail below, authorization functionality may be provided by, or in conjunction with, an operating system of device 100, which determines whether the code has been authorized by a trusted authority. If the code is authorized and verified as such, it may be generally executed without any further system or user interaction; if the code is not authorized, its ability to be executed on computing device 100 may be restricted or even prevented. In some embodiments, the computing device may alert the user that the code is not authorized and ask the user if they still wish to execute the unauthorized code. In other embodiments, computing devices 100 may be configured to prevent unauthorized code from being executed at all, regardless of the user's wishes.

In some embodiments, trusted authority 102 may authorize software 106 by digitally signing software 106. As is known in the art, a digital signature uses public key cryptography to ensure the integrity of data. For example, software developer 104 may provide trusted authority 102 with compiled object code. Trusted authority 102 may then create a digital signature with its private key to the object code of software 106 and may make the code available to computing devices 100.

When a request to execute the software may be made on computing device 100, computing device 100 checks the digital signature of software 106 to verify its authenticity and/or authorization. If the software is verified as being signed by trusted authority 102, software 106 may be executed on computing device 100. There are various ways for computing device 100 to check the digital signature of software 106 prior to execution.

Software developer 104 may be any person or organization that writes, develops, tests, markets, sells, and/or distributes software to run on computing devices 100. In one embodiment, developer 104 may be a company or enterprise developing software for use on devices 100 that it controls or manages.

As part of the software development cycle, software developer 104 may wish to test its software on computing devices that are similar to those on, which software 106 will be deployed in the field. Accordingly, software developer 104 may have one or more developer computing devices 100, which allow the software developer to develop, test, and/or otherwise further the development of software 106.

Developer computing device 100 may be the same as the computing devices 100 for, which developed software 106 may be intended. For example, if a software developer 104 may be writing software 106 to be run on a mobile telephone platform such as the iPhone, for example, developer computing device 100 may be an iPhone. Similarly, if the computing device platform 100 targeted for software 106 may be a media player, such as the iPod Touch, then developer computing device 100 may be an iPod touch. By using similar devices for testing and development, software developer 104 may be able to more efficiently develop and test software prior to distributing the software to end user for use on computing devices 100.

During the software development process, the code in a software application may be changed frequently. Accordingly, as will be described below, software developer may obtain and use developer access on one or more of computing devices 100. This developer access profile may be installed on the developer computing devices 100, which allows the developer to modify, recompile, and test their software on the devices 100 without the need to request additional code signing services from trusted authority 102.

In some embodiments, developer computing devices 100 may also, in addition to receiving developer access profiles, include development and test related software such as a debugging, tracing, or profiling software as part of a standard distribution installed on developer computing devices 100, as part of a pre-provisioning process, or at any other time. In some embodiments, developer computing devices 100 are pre-provisioned with such additional development related software. In other embodiments, development related software may be installed on the device with, or in conjunction with, the developer access profile.

FIG. 2 is a block diagram providing one example of how developer computing device 100 may be configured to utilize developer access profiles 208 to execute software modules 206 not signed by trusted authority 102. As noted above, developer computer device 100 may be same type of device as the computing devices 100 for, which software 106 created by software developer 104 may be provided.

Software 106 may include one or more software modules 206 stored on, or accessible by, device 100. In one embodiment, storage 209 of computing device 100 can include a computer-readable storage medium (volatile and/or non-volatile) that may be configured to store one or both of software modules 206 and profiles 208. Storage 209 may also be configured to store code of operating system 202, and may further include general purpose storage for device 100. The software modules 206 may be stored temporarily in device 100 or permanently in device 100.

Developer computing device 100 may include an operating system. The operating system may be a well-known operating system, such as MacOS, Windows, Linux, Unix, Symbian, or the like. As discussed briefly above, a portion of the operation system, e.g., the kernel of operating system 202 may be configured to require that code executed on device 100 be authorized prior allowing it to be executed on the device. This authorization may take the form of trusted authority 102 digitally signing some or all of the software modules 206. In some embodiments, trusted authority 102 utilizes a code signing certificate, which may be used to verify the source and integrity of the signed computer code.

Kernel space of memory used by operating system 202 conceptually may be considered a trusted space. The trust may be established by boot-time authentication of the kernel. In one embodiment, computing device 100 can include hardware support for providing the boot-time authentication of the kernel space used by operating system 202 and its contents. For example, in one embodiment, the boot loader of computing device 100 may authenticate a signature of the kernel software prior to loading and booting the kernel using, for example, suitable public key signature verification.

A digital signature may include a digest that may be created, for example, by performing a hash function on the software in order to create a message digest. In some embodiments, incremental code signing may be used. The hash value may be a hash value generated for all or a particular portion of the software. For example, in some embodiments, the software is divided into one or more units such as one or more pages. A hash value is generated for each unit or page of the software. The digest for the software in such embodiments includes a hash value that is generated for an array or table of the hash values of each code or page. The message digest may be then encrypted using a private encryption key associated with trusted authority 102. In one embodiment, the well known SHA-1 function may be used to generate the message digest. The encrypted message digest (also referred to as the signature) may be then appended to the one or more of the software modules 206.

In some embodiments, when a request is made on the device to execute software code, operating system 202 may process the request by verifying the source and integrity of the software code by validating the digital signature. If the source of the code is trusted authority 102, and the integrity of the code has not been compromised, operating system 202 may allow the code to run on computing device 100.

Developer computing device 100 may also include a device identifier 204. The device identifier 204 may take various forms. In one embodiment, device identifier 204 may be a serial number that uniquely identifies developer computing device 100. In other embodiments, device identifier 204 may be a unique identifier generated by operating system 202.

As noted above, developer computing device 100 may also have a developer access profile 208, created by trusted authority 102. Developer access profile 208 may include a set of data that indicates that certain devices are permitted to execute software not signed by trusted authority 102. In one embodiment, a developer access profile 208 allows software developers 104 to modify and recompile source code for their software modules 206, and then test the software modules 206 on developer computing device 100 without needing to request additional code signing services from trusted authority 102. Instead, software developer 104 may be permitted to digitally sign their software modules 206 and run the software on those developer computing devices 100, which have developer access profiles 208 that specify that code signed by developer 104 may be executed on device 100. In some embodiments, the developer access profile may also specify certain operations that developer 104 may perform in testing the software modules 206. For example, a developer access profile 208 may specify that the software modules 206 digitally signed by developer 104 may be debugged on the developer computing devices 100. Developer computing device 100 may also have more than one developer access profile 208.

In some embodiments, developer access profile 208 may operate in conjunction with policy service 210. Policy service 210 may take the form of a daemon or other process running in a user (untrusted) memory space of the operating system. Policy service 210 may be further configured to enforce policies specified in the developer access profile 208. For example, if a developer access profile 208 specifies that a developer can trace the operation of the software on the development device, but does not allow debugging, policy service 210 will allow trace operations, but disallow running applications in debug mode.

Policy service 210 may be initially started by operating system 202, which may verify a cryptographically secured digest of the service 210 before loading the service. Operating system 202 may maintain a reference to the service 210 via an interprocess communication or similar suitable port. Thus, while the profile service 210 executes in an untrusted or user-mode space, the code of the profile service 210 may be verified at execution to be signed by a trusted authority.

FIG. 3 is a more detailed view of the developer access profile 208. As noted above, developer access profile 208 may be a set of data stored in the memory of device 100, which indicates that the device may be permitted to execute software even though it has not been signed by trusted authority 102. Developer access profile 208 can include device identifier data 302, developer identifier data 304, and entitlement data 306.

Device identifier data 302 specifies one or more device identifiers 302 to, which the developer access profile 208 applies. In embodiments where the devices 100 are mobile telephone devices, device identifier data 302 may include an array of mobile telephone device serial numbers.

Device identifier data 302 for a developer access profile 208 may include one or more device identifiers 204 for different devices. In one embodiment device identifiers 204 may be specific identifiers, which may be represented as numeric or alphanumeric data, for specific devices. In other embodiments, more generalized device identifying data may be utilized. For example, some device vendors and/or manufacturers may provide devices having device identifiers, which are specific to an organization. For example, a device vendor and/or manufacturer may customize certain aspects of device identifiers 204 associated with devices based on the organization to, which they are delivered.

Device identifier data 302 may include ranges of device identifiers, rather than listing each individual device identifier value. In still other embodiments a bit mask or wild card characters may be used to specify that the developer access profile applies to all devices having specified identifier characteristics. In still other embodiments, device identifier data 302 may specify that developer access profile 208 applies to all devices. For example, in one such embodiment, software signed by one or more of the developers identified in developer identifier data 302 may be authorized to run on any device 100 upon, which the developer access profile 208 may be installed.

As noted, developer access profile 208 may further include developer identifier data 304, which specifies software developers 104 to whom the developer access profile 208 applies. Developer identifier data 304 may take various forms. In some embodiments, developer identifier data 304 may be public keys associated with software developers 104 covered by the developer access profile 208. Other types of identifiers may also be used. In some embodiments, developer identifier data 304 may be stored in an array data structure stored within the developer access profile. Of course, any suitable data structures may be used.

Furthermore, developer access profile 208 may include entitlement data 306. Entitlement data 306 may include data, which indicates the types of operations that are allowed for the software modules 206 signed by developers identified in the developer identifier data 304 on the devices 100 specified in device identifier data 302. A particular developer access profile 208 may specify more than one developer 104 as being authorized to digitally sign code authorized by the developer access profile 208.

Entitlement data 306 may specify the types of access that are permitted for applications signed by the developers 104 identified in the developer identifier data 304 with respect to the devices 100 identified in device identifier data 302. The entitlement data 306 may take the form of key-value pairs. The values may include, for example, numeric, Boolean, or alphanumeric data. In one embodiment, the entitlement data 306 may include an array or other data structure of predefined Boolean variables, which are indicative of various specified entitlements.

In one embodiment, entitlement data 306 may include the capability to be executed. In one embodiment, a debug allowed entitlement may be included, that when set to "TRUE" in a particular profile indicates that code signed by developers 104 associated with developer access profile 208 are permitted to execute software modules 206 on device 100 in a debug mode. If the debug mode allowed entitlement may be set to "FALSE," and developer 104 attempts to run the software in debug mode on device 100, policy service 210 may block the execution of the code. Other such entitlements may include entitlement data that may be indicative of a trace-allowed entitlement. Trace-allowed entitlement may allow software modules 206 digitally signed by developer 104 to be compiled and executed in trace mode on devices 100.

Other entitlements may control access to networking resources of device 100, data, libraries, or applications that have security or privacy implications such as address book data. In addition, other entitlements may control access to particular developer APIs including telephony, networking, address or phone storage, or multimedia APIs.

FIG. 4 is a block diagram illustrating illustrates relationships between events that occur when a request may be received and processed by the system between software components of one embodiment of computing device 100. As shown, in event 1, operating system 202, which can include a trusted space, may receive a request (in response to a user request to execute the particular software module 206 or in response to a request of another software component on device 100 to execute the particular software module 206) to executed an identified software module 206. In one embodiment, the request can include a reference to a directory or file of the storage 209, which stores the executable instruction code of software module 206.

In event 2, operating system 202 may communicate a request to authenticate software module 206 to policy service 210. In one embodiment, the authentication request can include the reference to the storage location in storage 209 associated with software module 206. Operating system 202 may also provide a digest of at least a portion of software module 206 to policy service 210. Alternatively, or in addition, policy service 210 may generate a digest of all or a portion of software module 206. In one embodiment, the digest may be based on digest values determined for each code page or each file associated with software module 206. In one embodiment, requests to policy service 210 may include other data such as specific entitlements that are to be enforced.

For example, operating system 202 may specify that the entitlement may be an entitlement to execute, to debug, or to access specified system resources. Operating system 202 or another portion of the operating system of device 100 may be configured to request entitlement authorization for access to specific networks such as a mobile telephone network, a Bluetooth stack, or to specific capabilities of device 100 such as to access a microphone, speaker, camera, or other I/O interface of device 100.

At event 5, policy service 210 may access one or more profiles 208 associated with execution of software module 206. In one embodiment, the profiles are accessed from storage 209. In one embodiment, profiles 208 include a particular profile associated with a developer of software module 206. It may be to be recognized that while profiles are described herein with respect to software developers 104 other than trusted authority 102, access to software modules provided by trusted authority 102, e.g., the device or operating system developer, may also be controlled using the systems and methods described herein.

At event 5, policy service 210 may verify the execution rights of software module 206 based on the digest and/or profile 208. For example, policy service 210 may be configured to receive a signature associated with the digest of software module 206 and cryptographically verify the digest. In one embodiment, policy service 210 may use a public key associated with a particular developer 104, and, which may be included as part of profile 208, to verify the signature of the digest.

In one embodiment, to ensure that the profile and the developer key may be trusted, policy service 210 cryptographically verifies that the profile may be trusted by trusted authority 102. In this embodiment, policy service 210 may verify the profile by verifying a digest or other signature of the profile (and its contents) using a public key of trusted authority 102 that may be stored on device 100 or otherwise accessed, e.g., via a data network, by device 100.

Policy service 210 may be further configured to verify that software module 206 may be authorized for the particular device 100. For example, in one embodiment, profile 208 can include one or more device identifiers or data for matching device identifiers (e.g., a mask or wildcard to match a specified group of devices 100).

Policy service 210 may compare the identifiers to an identifier securely maintained by device 100 and authorizes the software module when the identifier data of the policy 208 matches that of device 100. The device identifier may include any data stored on the device that may be used for identification including a manufacturer serial number, device or subscriber identifiers of a mobile telephone device such as an Integrated Circuit Card ID (ICCID), International Mobile Subscriber Identifier (IMSI) of a SIM card currently inserted into device 100, the International Mobile Equipment Identifier (IMEI) encoded on the device, an electronic serial number (ESN), or any other data suitable to identify the devices 100 for, which a particular software module 206 may be authorized.

Policy service 210 may be configured to authorize software module 206 based on further entitlements or other capabilities as specified by profiles 208. Executable or not-executable may be considered as an example of am entitlement. Other entitlements may specify whether the particular software module 206 may execute or access services based on one or more of profiles 208 and on any other policy that policy service 210 may be configured to enforce.

Policy service 210 may be configured to execute in user space such that the policies and profiles enforced therein may be arbitrarily complex and subject to update without increasing the size of the kernel or other protected memory spaces and be more easily developed and revised without the difficulties generally associated with kernel programming.

It is to be recognized that while FIG. 5 illustrates an example of operating system 202 determining whether a particular software module 206 has an entitlement to be executed, the methods and systems described herein may be used to authorize access to device hardware capabilities, other services of the kernel other operating system services, or services of another software module 208. For example, device 100 may include a debugging or trace facility provided, for example, by operating system 202 or other operating system component that may be only authorized accordingly to policies enforced by the policy server 210. For example, a debugger interface (not shown) may request authorization for debugging of a particular software module 206 using the system illustrated in FIG. 5 based on a debugging entitlement specified in profile 208 associated with software module 206 or via other policy.

Entitlements may be enforced via one or more policies associated with the device. For example, a policy for enforcing entitlements may include processing entitlement data in profiles as a white list, e.g., software module 206 may be authenticated for a particular such entitlement when profile 208 can include data indicating that entitlement exists for the particular software module 206 and/or the particular device 100. Another policy may enforce entitlements based on a blacklist, e.g., software module 206 may be authenticated for a particular such entitlement unless profile 208 or applicable policy can include data negating that entitlement for the particular software module 206 and/or the particular device 100. In another embodiment, device 100 may be configured with a policy such that some entitlements may be configured to be enforced via a white list while others are configured to be enforced via a blacklist.

Other policies may be included to more finely control particular entitlements or to resolve conflicting profile data. For example, in one embodiment, a mobile service provider may include a particular carrier profile 208 in devices for use on its network that further specifies entitlements to particular device capabilities, e.g., voice network or dialer access, which may conflict with the developer profile 208 for particular software modules 206. In such an event, a policy of device 100 may specify that the entitlement specification of one of the profiles controls.

In event 6, when policy service 210 may verify the entitlements and/or other execution rights of the software module 240, policy service 210 provides operating system 202 or other client of policy service 210 with data indicative of the entitlements of software module 206 and/or the entitlements for, which the request to authenticate was made. In event 7, operating system 202 may then execute software module 206 in accordance with the entitlement data received from policy service 210.

FIG. 5 is a flowchart illustrating one embodiment of a method 500 of verifying entitlements of software modules 206 in devices 100. The method may begin at a block 502 in, which a trusted space of operating system 202 receives a request to execute a particular software module 206. In one embodiment, the trusted space may be established on startup of the device by a bootloader of device 100 that cryptographically verifies operating system 202 prior to loading.

In block 504, the trusted space process communicates data indicative of software module 206 to policy service 210 executing in untrusted space, but to, which trust has been granted upon initial execution of policy service 210. The data may include a reference to a storage location of software module 206 and, optionally, data indicative of a particular entitlement being authenticated.

Next at block 506, policy service 210 authenticates software module 206. In one embodiment, policy service 210 authenticates software module 206 based on cryptographic authentication. For example, policy service 210 may authenticate software module 206 by verifying a digital signature of software module 206 using suitable cryptographic techniques such as asymmetric/public key encryption. Further, one or more entitlements associated with software module 206 may be authenticated similar cryptographic techniques. Further details of block 506 may be found with reference to FIG. 6.

Proceeding to block 508, policy service 210 communicates data indicative of execution rights of the software module to the kernel of operating system 202. The data may include a Boolean authentication response, data indicative of one or more entitlements of software module 206, a verified digest of software module 206, or any other suitable data relative to the request.

In block 510, operating system 202 or other trusted process may then execute software module 206 or may perform services for software module 206 based on the authenticated entitlements.

FIG. 6 is a flowchart illustrating block 506 of the method of FIG. 5 in more detail. At block 602, policy service 210 may calculate a digest of at least one file or other data structure associated with the executable code of software module 206. The digest may be calculated using any suitable hash algorithm, including, for example, SHA-1.

In block 604, policy service 210 may identify one or more profiles 208 associated with software module 206 and/or device 100. In one embodiment profiles 208 can each include a signing key and data indicative of entitlements of software module 206. For example, an entitlement may include a data structure in tabular form such as illustrated in Table 1.

TABLE 1

| Example Profile Data | |
| --- | --- |
| Developer Signing Key | 123555 |
| Device ID1 | 123FFF |
| Device ID2 | 123FFF |
| Executable | TRUE |
| Debuggable | FALSE |
| Can_Access_Network | TRUE |
| Code Digest | AAFF1144BB |

Software modules 206 may be associated with profiles 208 via key-value pairs of the profile that identify the digest (e.g., the "Code Digest" illustrated in Table 1) of software module 206. Profile 208 may further include a digital signature, e.g., a digest of the profile cryptographically signed by, for example, trusted authority 102. Next at a block 606, policy service 210 cryptographically verifies profile 208, e.g., by verifying that the cryptographic signature of the digest of profile 208 may be correct.

Moving to block 608, policy service 210 verifies that profile 208 may be applicable to the particular device 100. In one embodiment, the verifying may include comparing the device identifier 204 of the particular device 100 to the device identifiers listed in the signed profile 208. The previous signature verification at the block 606 may provide assurance that the device identified in profile 208 have not been changed or modified without authorization.

Next at block 610, policy service 210 may identify execution rights associated with software module 206 based on profile(s) 208. In one embodiment, the identifying can include accessing the entitlements of each profile.

In block 612, policy service 210 may verify that the entitlements to be verified for software module 206 are consistent with policies for computing device 100. In one embodiment, the verifying can include determining whether the requested entitlement may be included in profiles 208 associated with software module 206 and policies of device 100.

Proceeding to block 614, policy service 210 may then compare the digest value calculated at the block 602 to the signed digest of software module 206 and verify the cryptographic signature of the digest. It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

FIG. 7 is a block diagram illustrating an example of one of the devices 100 embodied as a mobile device. Device 100 can include a processor 702 that may be in communication with a memory 704. The network interface 706 can include a receiver 724 and transmitter 726 configured to communicate via signals according to one or more suitable data and/or voice communication systems. For example, network interface 708 may be communicate to communicate voice and/or data over mobile telephone networks such as GSM, CDMA, CDMA2000, EDGE or, UMTS. Network interface 706 may further include receiver/transmitters for other data networks including, for example, any IEEE 802.x network such as WiFi or Bluetooth.

Device 100 may also include one or more of display 710, user input device 712 such as a key, touch screen, or other suitable tactile input device, loudspeaker 714 comprising a transducer adapted to provide audible output based on a signal received over communication link 106 and/or microphone 716 comprising a transducer adapted to provide audible input of a signal that may be transmitted over one or both of the communication links 106 and 108.

In one embodiment, input device 712 can include an accelerometer or other device configured to detect movement of the device. Device 100 may optionally include a battery 731 to provide power to one or more components of device 100. Device 100 may include at least one of a mobile handset, a personal digital assistant, a laptop computer, a headset, a vehicle hands free device, or any other electronic device. For example, one or more aspects taught herein may be incorporated into a phone (e.g., a mobile phone), a personal data assistant ("PDA"), an entertainment device (e.g., a music or video device), a headset (e.g., headphones, an earpiece, etc.), a microphone, or any other electronic device. As described further below, in some embodiments, the device 100 is implemented as a mobile device.

Figure 8A:
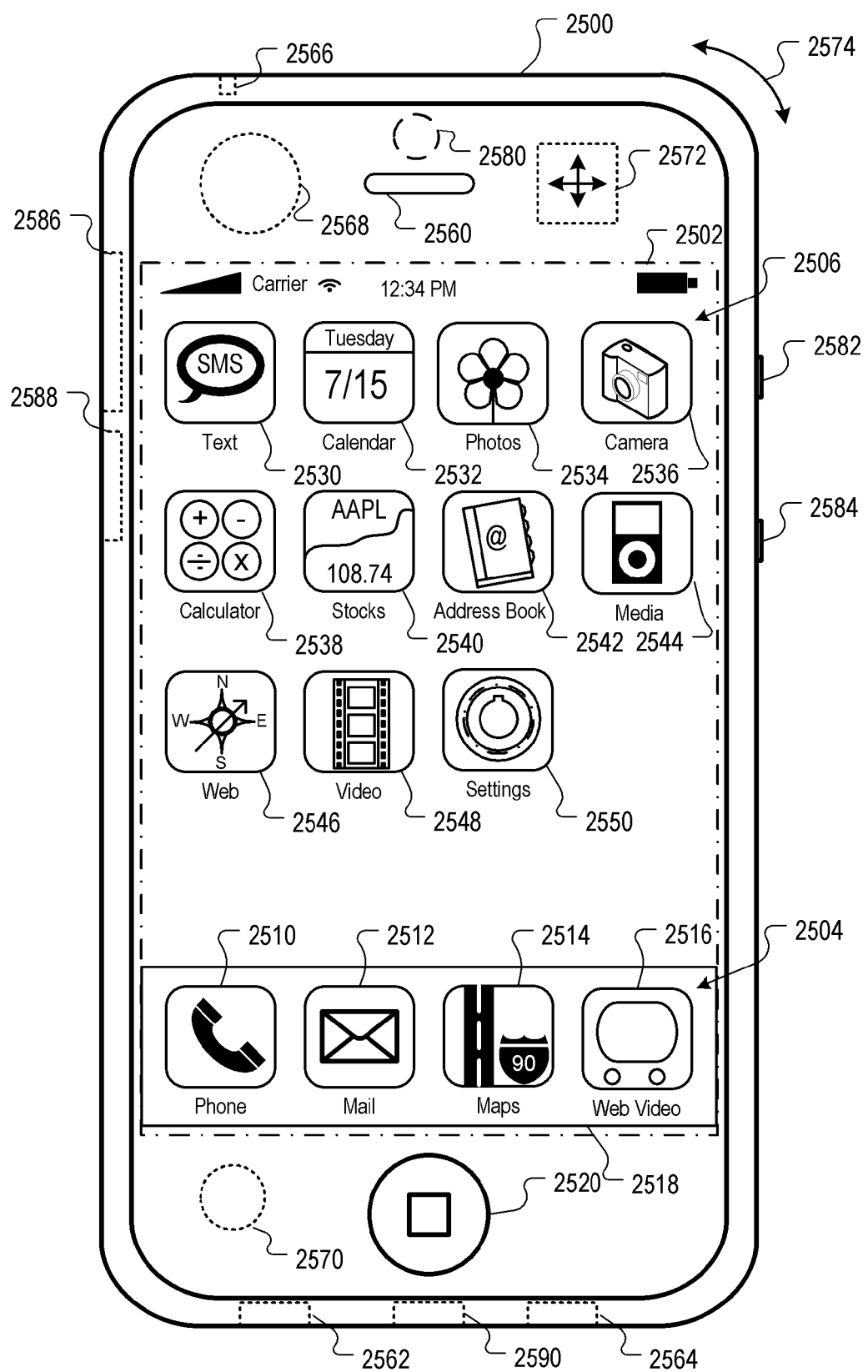
FIGS. 8A and 8B are block diagrams illustrating one example of a computing device such as illustrated in FIG. 2.

FIG. 8A illustrates an example mobile device 2500. The mobile device 2500 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 2500 includes a touch-sensitive display 2502. The touch-sensitive display 2502 can be implemented with liquid crystal display (LCD) technology, light emitting polymer display (LPD) technology, or some other display technology. The touch-sensitive display 2502 can be sensitive to haptic and/or tactile contact with a user.

In some implementations, the touch-sensitive display 2502 can comprise a multi-touch-sensitive display 2502. A multi-touch-sensitive display 2502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 2500 can display one or more graphical user interfaces on the touch-sensitive display 2502 for providing the user access to various system objects and for conveying information to the user. In some implementations, the graphical user interface can include one or more display objects 2504, 2506. In the example shown, the display objects 2504, 2506, are graphic representations of system objects. Some examples of system objects include device functions, applications, windows, files, alerts, events, or other identifiable system objects.

Example Mobile Device Functionality

In some implementations, the mobile device 2500 can implement multiple device functionalities, such as a telephony device, as indicated by a Phone object 2510; an e-mail device, as indicated by the Mail object 2512; a map devices, as indicated by the Maps object 2514; a Wi-Fi base station device (not shown); and a network video transmission and display device, as indicated by the Web Video object 2516. In some implementations, particular display objects 2504, e.g., the Phone object 2510, the Mail object 2512, the Maps object 2514, and the Web Video object 2516, can be displayed in a menu bar 2518. In some implementations, device functionalities can be accessed from a top-level graphical user interface, such as the graphical user interface illustrated in FIG. 8A. Touching one of the objects 2510, 2512, 2514, or 2516 can, for example, invoke a corresponding functionality.

In some implementations, the mobile device 2500 can implement a network distribution functionality. For example, the functionality can enable the user to take the mobile device 2500 and provide access to its associated network while traveling. In particular, the mobile device 2500 can extend Internet access (e.g., Wi-Fi) to other wireless devices in the vicinity. For example, mobile device 2500 can be configured as a base station for one or more devices. As such, mobile device 2500 can grant or deny network access to other wireless devices.

In some implementations, upon invocation of a device functionality, the graphical user interface of the mobile device 2500 changes, or is augmented or replaced with another user interface or user interface elements, to facilitate user access to particular functions associated with the corresponding device functionality. For example, in response to a user touching the Phone object 2510, the graphical user interface of the touch-sensitive display 2502 may present display objects related to various phone functions; likewise, touching of the Mail object 2512 may cause the graphical user interface to present display objects related to various e-mail functions; touching the Maps object 2514 may cause the graphical user interface to present display objects related to various maps functions; and touching the Web Video object 2516 may cause the graphical user interface to present display objects related to various web video functions.

In some implementations, the top-level graphical user interface environment or state of FIG. 8A can be restored by pressing a button 2520 located near the bottom of the mobile device 2500. In some implementations, each corresponding device functionality may have corresponding "home" display objects displayed on the touch-sensitive display 2502, and the graphical user interface environment of FIG. 8A can be restored by pressing the "home" display object.

In some implementations, the top-level graphical user interface can include additional display objects 2506, such as a short messaging service (SMS) object 2530, a Calendar object 2532, a Photos object 2534, a Camera object 2536, a Calculator object 2538, a Stocks object 2540, a Address Book object 2542, a Media object 2544, a Web object 2546, a Video object 2548, a Settings object 2550, and a Notes object (not shown). Touching the SMS display object 2530 can, for example, invoke an SMS messaging environment and supporting functionality; likewise, each selection of a display object 2532, 2534, 2536, 2538, 2540, 2542, 2544, 2546, 2548, and 2550 can invoke a corresponding object environment and functionality.

Additional and/or different display objects can also be displayed in the graphical user interface of FIG. 8A. For example, if the device 2500 is functioning as a base station for other devices, one or more "connection" objects may appear in the graphical user interface to indicate the connection. In some implementations, the display objects 2506 can be configured by a user, e.g., a user may specify which display objects 2506 are displayed, and/or may download additional applications or other software that provides other functionalities and corresponding display objects.

In some implementations, the mobile device 2500 can include one or more input/output (I/O) devices and/or sensor devices. For example, a speaker 2560 and a microphone 2562 can be included to facilitate voice-enabled functionalities, such as phone and voice mail functions. In some implementations, an up/down button 2584 for volume control of the speaker 2560 and the microphone 2562 can be included. The mobile device 2500 can also include an on/off button 2582 for a ring indicator of incoming phone calls. In some implementations, a loud speaker 2564 can be included to facilitate hands-free voice functionalities, such as speaker phone functions. An audio jack 2566 can also be included for use of headphones and/or a microphone.

In some implementations, a proximity sensor 2568 can be included to facilitate the detection of the user positioning the mobile device 2500 proximate to the user's ear and, in response, to disengage the touch-sensitive display 2502 to prevent accidental function invocations. In some implementations, the touch-sensitive display 2502 can be turned off to conserve additional power when the mobile device 2500 is proximate to the user's ear.

Other sensors can also be used. For example, in some implementations, an ambient light sensor 2570 can be utilized to facilitate adjusting the brightness of the touch-sensitive display 2502. In some implementations, an accelerometer 2572 can be utilized to detect movement of the mobile device 2500, as indicated by the directional arrow 2574. Accordingly, display objects and/or media can be presented according to a detected orientation, e.g., portrait or landscape. In some implementations, the mobile device 2500 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 2500 or provided as a separate device that can be coupled to the mobile device 2500 through an interface (e.g., port device 2590) to provide access to location-based services.

In some implementations, a port device 2590, e.g., a Universal Serial Bus (USB) port, or a docking port, or some other wired port connection, can be included. The port device 2590 can, for example, be utilized to establish a wired connection to other computing devices, such as other communication devices 2500, network access devices, a personal computer, a printer, a display screen, or other processing devices capable of receiving and/or transmitting data. In some implementations, the port device 2590 allows the mobile device 2500 to synchronize with a host device using one or more protocols, such as, for example, the TCP/IP HTTP, UDP and any other known protocol.

The mobile device 2500 can also include a camera lens and sensor 2580. In some implementations, the camera lens and sensor 2580 can be located on the back surface of the mobile device 2500. The camera can capture still images and/or video.

The mobile device 2500 can also include one or more wireless communication subsystems, such as an 802.11b/g communication device 2586, and/or a Bluetooth™ communication device 2588. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

Figure 8B:
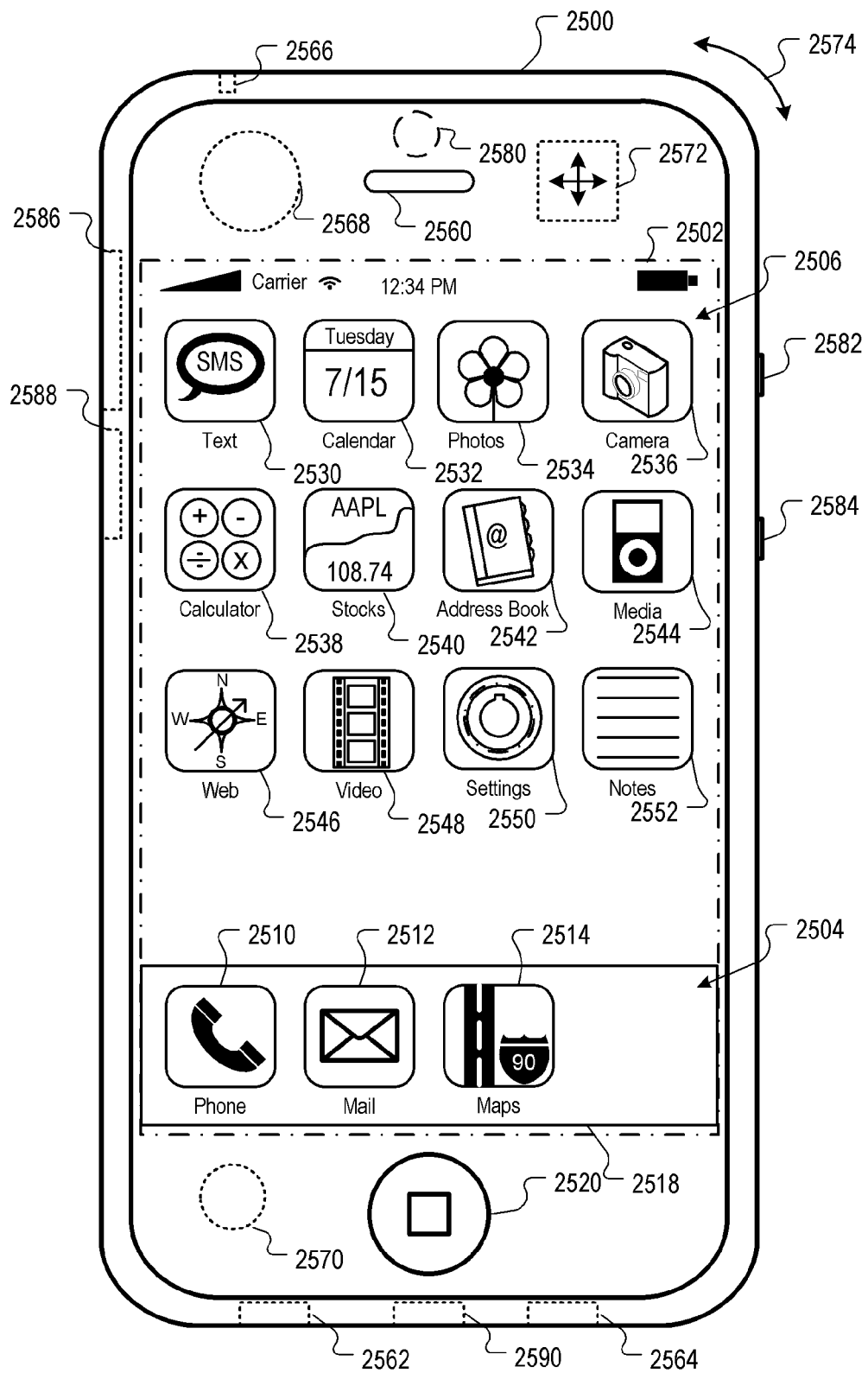

FIG. 8B illustrates another example of configurable top-level graphical user interface of device 2500. The device 2500 can be configured to display a different set of display objects.

In some implementations, each of one or more system objects of device 2500 has a set of system object attributes associated with it; and one of the attributes determines whether a display object for the system object will be rendered in the top-level graphical user interface. This attribute can be set by the system automatically, or by a user through certain programs or system functionalities as described below. FIG. 8B shows an example of how the Notes object 2552 (not shown in FIG. 8A) is added to and the Web Video object 2516 is removed from the top graphical user interface of device 2500 (e.g. such as when the attributes of the Notes system object and the Web Video system object are modified).

Example Mobile Device Architecture

Figure 9:
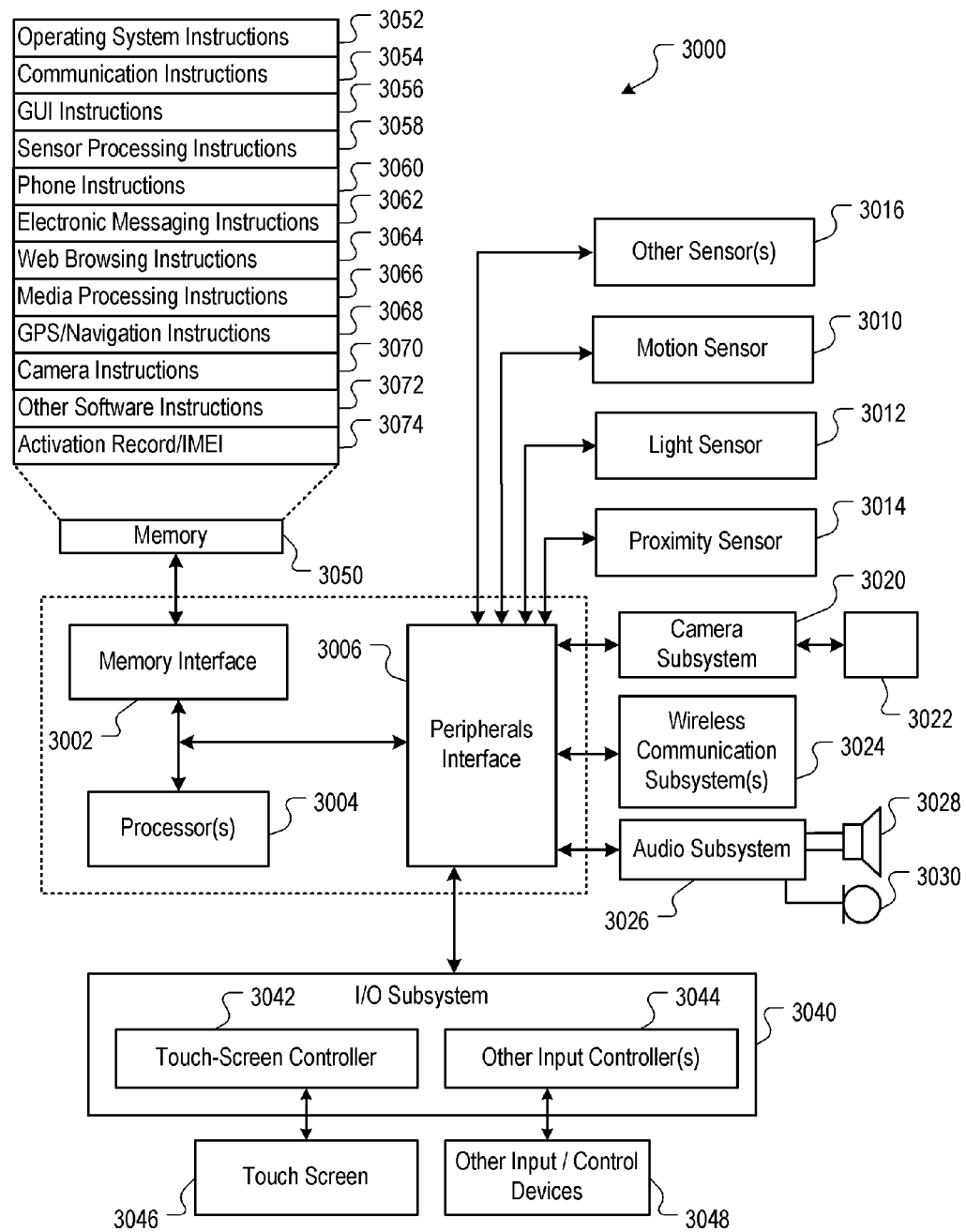
FIG. 9 is a block diagram illustrating one example of an implementation of a mobile device such as illustrated in FIGS. 8A and 8B.

FIG. 9 is a block diagram 3000 of an example implementation of a mobile device (e.g., mobile device 2500). The mobile device can include a memory interface 3002, one or more data processors, image processors and/or central processing units 3004, and a peripherals interface 3006. The memory interface 3002, the one or more processors 3004 and/or the peripherals interface 3006 can be separate components or can be integrated in one or more integrated circuits. The various components in the mobile device can be coupled by one or more communication buses or signal lines.

Sensors, devices, and subsystems can be coupled to the peripherals interface 3006 to facilitate multiple functionalities. For example, a motion sensor 3010, a light sensor 3012, and a proximity sensor 3014 can be coupled to the peripherals interface 3006 to facilitate the orientation, lighting, and proximity functions described with respect to FIG. 8A. Other sensors 3016 can also be connected to the peripherals interface 3006, such as a positioning system (e.g., GPS receiver), a temperature sensor, a biometric sensor, or other sensing device, to facilitate related functionalities.

A camera subsystem 3020 and an optical sensor 3022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 3024, which can include radio frequency receivers and transmitters and/or optical (e.g., infrared) receivers and transmitters. The specific design and implementation of the communication subsystem 3024 can depend on the communication network(s) over which the mobile device is intended to operate. For example, a mobile device can include communication subsystems 3024 designed to operate over a GSM network, a GPRS network, an EDGE network, a Wi-Fi or WiMax network, and a Bluetooth™ network. In particular, the wireless communication subsystems 3024 may include hosting protocols such that the mobile device may be configured as a base station for other wireless devices.

An audio subsystem 3026 can be coupled to a speaker 3028 and a microphone 3030 to facilitate voice-enabled functions, such as voice recognition, voice replication, digital recording, and telephony functions.

The I/O subsystem 3040 can include a touch screen controller 3042 and/or other input controller(s) 3044. The touch-screen controller 3042 can be coupled to a touch screen 3046. The touch screen 3046 and touch screen controller 3042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 3046.

The other input controller(s) 3044 can be coupled to other input/control devices 3048, such as one or more buttons, rocker switches, thumb-wheel, infrared port, USB port, and/or a pointer device such as a stylus. The one or more buttons (not shown) can include an up/down button for volume control of the speaker 3028 and/or the microphone 3030.

In one implementation, a pressing of the button for a first duration may disengage a lock of the touch screen 3046; and a pressing of the button for a second duration that is longer than the first duration may turn power to the mobile device on or off. The user may be able to customize a functionality of one or more of the buttons. The touch screen 3046 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 3002 can be coupled to memory 3050. The memory 3050 can include high-speed random access memory and/or non-volatile memory, such as one or more magnetic disk storage devices, one or more optical storage devices, and/or flash memory (e.g., NAND, NOR). The memory 3050 can store an operating system 3052, such as Darwin, RTXC, LINUX, UNIX, OS X, WINDOWS, or an embedded operating system such as VxWorks. The operating system 3052 may include instructions for handling basic system services and for performing hardware dependent tasks. In some implementations, the operating system 3052 can be a kernel (e.g., UNIX kernel).

The memory 3050 may also store communication instructions 3054 to facilitate communicating with one or more additional devices, one or more computers and/or one or more servers. The memory 3050 may include graphical user interface instructions 3056 to facilitate graphic user interface processing; sensor processing instructions 3058 to facilitate sensor-related processing and functions; phone instructions 3060 to facilitate phone-related processes and functions; electronic messaging instructions 3062 to facilitate electronic-messaging related processes and functions; web browsing instructions 3064 to facilitate web browsing-related processes and functions; media processing instructions 3066 to facilitate media processing-related processes and functions; GPS/Navigation instructions 3068 to facilitate GPS and navigation-related processes and instructions; camera instructions 3070 to facilitate camera-related processes and functions; and/or other software instructions 3072 to facilitate other processes and functions. The memory 3050 may also store other software instructions (not shown), such as web video instructions to facilitate web video-related processes and functions; and/or web shopping instructions to facilitate web shopping-related processes and functions. In some implementations, the media processing instructions 3066 are divided into audio processing instructions and video processing instructions to facilitate audio processing-related processes and functions and video processing-related processes and functions, respectively. An activation record and International Mobile Equipment Identity (IMEI) 3074 or similar hardware identifier can also be stored in memory 3050.

In view of the above, one will recognize that embodiments overcome problems that may include enforcing execution profiles so as to allow developers to develop and test applications in an execution environment where applications are generally provided by one or more other trusted entities. In addition, device providers, such as enterprises, may be provided the flexibility to distribute custom developed applications without distributing such applications via the trusted entities.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes, which come within the meaning and range of equivalency of the claims are to be embraced within their scope.

What is claimed is:

1. A computerized method of authorizing software on an electronic device including a processor, the method comprising:
   receiving, by a kernel executing in a trusted space of an operating system executing on the processor, a request to execute a software module stored on the electronic device, the software module created by a developer trusted to test software on the electronic device;
   communicating, by the kernel, data indicative of the software module to a policy service executing as a trusted process in an untrusted space of an operating system executing on the processor, the data indicative of the software module comprising at least one entitlement requested for executing the software module, and the policy service having been verified trusted upon execution;
   obtaining, by the policy service, a digest generated from at least one portion of executable instructions for the software module, the digest signed by the developer;
   identifying, by the policy service, one or more profiles for the developer associated with the software module, the one or more profiles created and signed by a trusted authority and comprising data indicative of at least one entitlement permitted for executing software created by the developer;
   authenticating, by the policy service, the at least one requested entitlement based at least in part on verifying the at least one requested entitlement against the at least one permitted entitlement in the one or more identified profiles and verifying the digest;
   communicating, by the policy service, the at least one requested entitlement to the kernel; and
   executing, by the kernel, the software module on the processor based on the at least one requested entitlement.

2. The method of claim 1, wherein the software module comprises at least one of an application program and a shared library.

3. The method of claim 1, wherein the digest is generated based on a plurality of digest values indicative of respective portions of the software module.

4. The method of claim 1, wherein the digest comprises a SHA-1 hash indicative of the at least one portion.

5. The method of claim 1, wherein verifying the digest comprises authenticating a cryptographic signature of the digest based on a cryptographic key of the developer.

6. The method of claim 5, wherein authenticating the cryptographic signature of the digest comprises:
   calculating a cryptographic signature of the digest based on a public key of the developer; and
   comparing the calculated signature with the signature of the digest.

7. The method of claim 5, wherein each profile comprises data indicative of at least one device identifier and authenticating the at least one requested entitlement comprises:
   authenticating the one or more profiles based on a cryptographic key of the trusted authority stored on the electronic device;
   comparing the at least one device identifier of the profile to a device identifier of the electronic device; and
   authenticating the at least one requested entitlement based on the comparing.

8. The method of claim 1, wherein the at least one requested entitlement comprises at least one or more of an allow debugging entitlement, an allow trace entitlement, an allow access to address book data entitlement, or allow access to multimedia API entitlement.

9. A non-transient computer readable medium, comprising instructions that when executed by a processor of an electronic device, perform a method of:
   receiving, by a kernel executing in a trusted space of an operating system executing on the processor, a request to execute a software module stored on the electronic device, the software module created by a developer trusted to test software on the electronic device;
   communicating, by the kernel, data indicative of the software module to a policy service executing as a trusted process in an untrusted space of an operating system executing on the processor, the data indicative of the software module comprising at least one entitlement requested for executing the software module, and the policy service having been verified as trusted upon execution;
   obtaining, by the policy service, a digest generated from at least one portion of executable instructions for the software module, the digest signed by the developer;
   identifying, by the policy service, one or more profiles for the developer associated with the software module, the one or more profiles created and signed by a trusted authority and comprising data indicative of at least one entitlement permitted for executing software created by the developer;
   authenticating, by the policy service, the at least one requested entitlement based at least in part on verifying the at least one requested entitlement against the at least one permitted entitlement in the one or more identified profiles and verifying the digest;
   communicating, by the policy service, the at least one requested entitlement to the kernel; and
   executing, by the kernel, the software module on the processor based on the at least one requested entitlement.

10. The non-transient computer readable medium of claim 9, wherein the software module comprises at least one of an application program and a shared library.

11. The non-transient computer readable medium of claim 9, wherein the digest is generated based on a plurality of digest values indicative of respective portions of the software module.

12. The non-transient computer readable medium of claim 9, wherein the digest comprises a SHA-1 hash indicative of the at least one portion.

13. The non-transient computer readable medium of claim 9, wherein verifying the digest comprises authenticating a cryptographic signature of the digest based on a cryptographic key of the developer.

14. The non-transient computer readable medium of claim 13, wherein authenticating the at least one entitlement comprises:
   calculating a cryptographic signature of the digest based on a public key of the developer; and
   comparing the calculated signature with the signature of the digest.

15. The non-transient computer readable medium of claim 13, wherein each profile comprises data indicative of at least one device identifier and authenticating the at least one requested entitlement comprises:
   authenticating the one or more profiles based on a cryptographic key of the trusted authority stored on the electronic device;
   comparing the at least one device identifier of the profile to a device identifier of the electronic device; and
   authenticating the at least one requested entitlement based on the comparing.

16. The non-transient computer readable medium of claim 9, wherein the at least one requested entitlement comprises at least one or more of an allow debugging entitlement, an allow trace entitlement, an allow access to address book data entitlement, or allow access to multimedia API entitlement.

17. A device comprising:
   a storage configured to:
      store a software module for execution on the device; and
      store at least one profile comprising at least one entitlement permitted for executing software created by a developer that created the software module, the at least one profile created and signed by a trusted authority and the developer trusted to test software on the device; and
   at least one processor configured to:
      receive, by a kernel executing in a trusted space of an operating system executing on the processor, a request to execute the software module;
      communicate, by the kernel, data indicative of the software module to a policy service executing as a trusted process in an untrusted space of an operating system executing on the processor, the data indicative of the software module comprising at least one entitlement requested for executing the software module, and the policy service having been verified as trusted upon execution;
      obtain, by the policy service, a digest indicative of at least one portion of the executable instructions associated with the software module;
      identify, by the policy service, the at least one profile associated with the software module;
      authenticate, by the policy service, the at least one requested entitlement based at least in part on verifying the at least one requested entitlement against the at least one permitted entitlement in the at least one identified profile and verifying the digest;
      communicate, by the policy service, the at least one requested entitlement to the kernel; and
      execute, by the kernel, the software module based on the at least one requested entitlement.

18. The device of claim 17, wherein the software module comprises at least one of an application program and a shared library.

19. The device of claim 17, wherein the digest is generated by the processor based on a plurality of digest values indicative of respective portions of the software module.

20. The device of claim 17, wherein the digest comprises a SHA-1 hash indicative of the at least one portion.

21. The device of claim 17, wherein to verify the digest, the processor is further configured to authenticate a cryptographic signature of the digest based on a cryptographic key of the developer.

22. The device of claim 21, wherein to authenticate the cryptographic signature of the digest, the processor is further configured to:
   calculate a cryptographic signature of the digest based on a public key of the developer; and
   compare the calculated signature with the signature stored with the software module.

23. The device of claim 21, wherein the at least one profile comprises data indicative of at least one device identifier and to authenticate the at least one requested entitlement, the processor is further configured to:
   authenticate the at least one profile based on a cryptographic key of the trusted authority stored on the device;
   compare the device identifier of the at least one profile to a device identifier of the electronic device; and
   authenticate the at least one entitlement based on a result of the comparing.

24. The device of claim 17, wherein the at least one requested entitlement comprises at least one or more of an allow debugging entitlement, an allow trace entitlement, an allow access to address book data entitlement, or allow access to multimedia API entitlement.

* * * * *